Dec. 10, 1940.  H. W. LEAVITT  2,224,686
LIGHT PROJECTING MACHINE
Filed Feb. 23, 1939  2 Sheets-Sheet 1
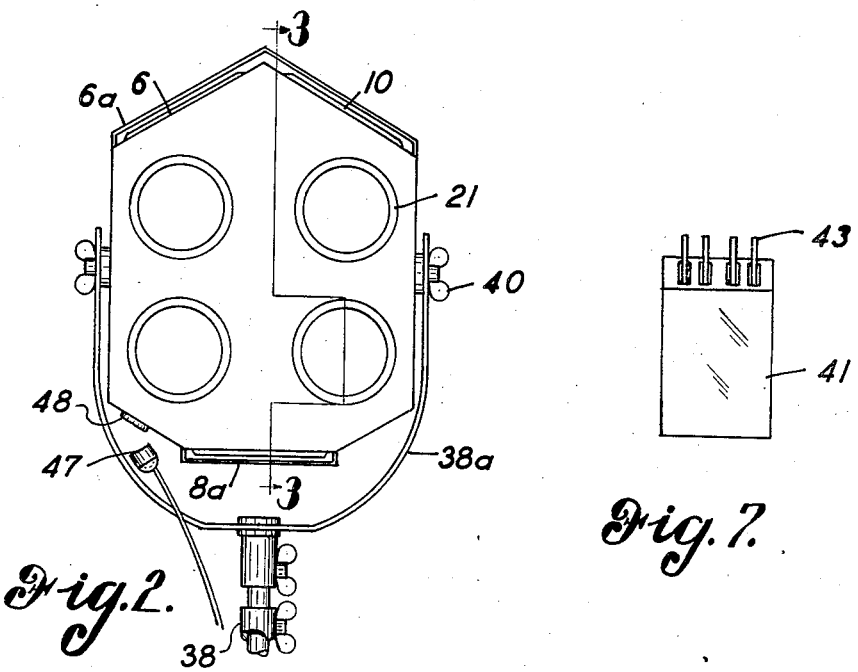
Fig. 2.
Fig. 7.
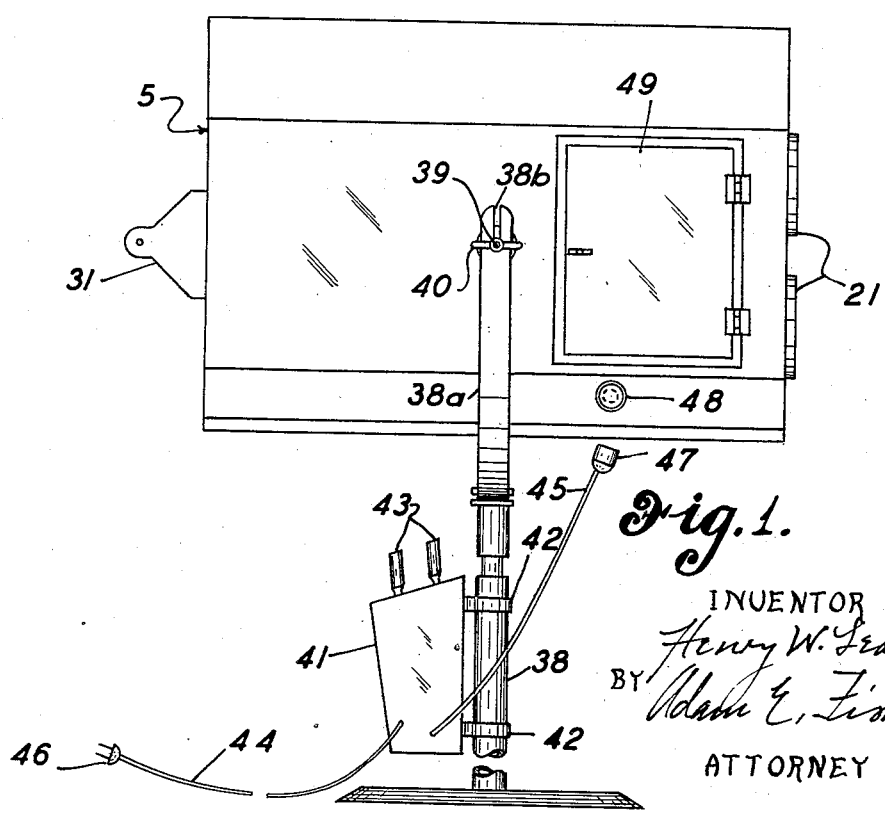
Fig. 1.
INVENTOR
Henry W. Leavitt
BY Adam E. Fisher
ATTORNEY Dec. 10, 1940.     H. W. LEAVITT     2,224,686
LIGHT PROJECTING MACHINE
Filed Feb. 23, 1939     2 Sheets-Sheet 2

INVENTOR.
Henry W. Leavitt
BY Adam E. Fisher
ATTORNEY

Patented Dec. 10, 1940

2,224,686

UNITED STATES PATENT OFFICE 2,224,686

LIGHT PROJECTING MACHINE

Henry W. Leavitt, Ogden, Utah

Application February 23, 1939, Serial No. 257,890

3 Claims. (Cl. 240—44.2)

This invention presents new and useful improvements in light projecting machines and relates more particularly to color projectors such as are used in theatre and stage lighting.

The principal object of this invention is to present a machine having provision therein for the individual or simultaneous projection of the primary colors of the spectrum as well as a clear beam of white light, whereby the various secondary colors of the spectrum may be formed and their degree of intensity and illumination varied by the proper manipulation of the projecting machine.

Another object of this invention is to provide a housing having partitions therein forming a plurality of lightproof compartments, each compartment having a lamp socket with a lamp positioned therein, a reflector, and an objective lens mounted so as to project a focused beam of light when the lamp is lighted. The aforementioned lamp sockets and reflectors being positioned upon carriages slidably mounted within the housing and adapted to be controlled externally, the intensity of the lamps to be controlled by a suitable rheostat.

With the foregoing and other objects in view, reference will be had to the accompanying drawings forming a part of this specification, wherein:

Figure 1 is a side view of the invention showing the rheostat mounted upon the supporting stand thereof, a portion of the stand being removed.

Figure 2 is a front end view of the projector and the upper portion of the stand.

Figure 7 is a front view of the rheostat.

Figure 3:
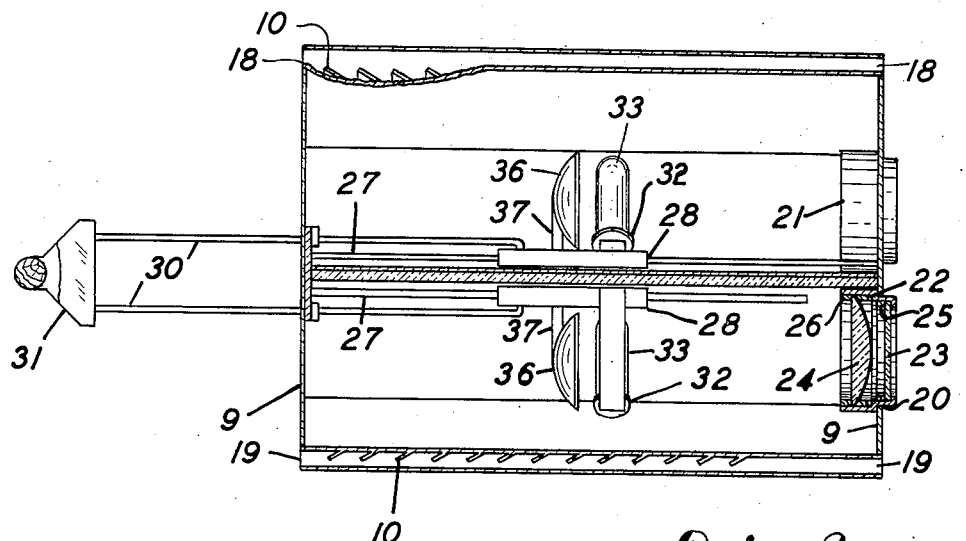
Figure 3 is a sectional view of the projector on the line 3—3 of Figure 2, the projector being removed from the supporting stand and the focusing handle being in the partially extended position.

Referring more particularly to the drawings it will be seen that the invention comprises a suitable elongated housing represented generally at 5, the same including the angularly disposed double top walls 6—6a, the angular sides 7, the double bottom walls 8—8a and the ends 9, the inner top and bottom walls 6—8 having ventilating louvers 10 struck outwardly therefrom.

Spaced partition strips 11 are horizontally and longitudinally extended through this housing from end to end and suitably anchored at sides and ends, thereby providing between them a longitudinally extended slot or airway 12. This horizontal partition thus divides the housing into upper and lower compartments, and the latter is then again divided into right and left sections or compartments by means of the vertically extended partition 13 anchored at bottom and ends to the walls of the housing, and with its inner or upper margin disposed below and in spaced relation to the median line of the slot or airway 12, thereby providing ventilating openings leading upwardly from the two lower compartments. The upper compartment of the housing is similarly sub-divided into right and left hand sections or compartments by means of a double, vertically extended partition 14—15, having ventilating perforations 14a—15a therethrough, the said partitions being connected at their ends to the ends of the housing, at their upper margins to the inner margins of a slot 16 formed in the inner top wall 6 at the apex thereof, and at their lower margins to the inner margins of the horizontal partition strips 11. Thus four compartments 5a are provided and an airway 17 is formed between or within the double partition 14—15, and the slot 16 leads therefrom at the top out through the inner wall of the double top into the angle or apex of the top. Openings 18—19 between the double top and bottom walls lead through the ends of the housing whereby air ducts, or airways are provided for all four sections or compartments, to wit: the warm air travels from below up through the airways, 19—10—17—18 and out at the top.

Circular lens openings 20 are provided in the forward ends of the four compartments of the housing for the reception of conventional lens holders 21, said holders being secured within the openings by means of shoulders 22 formed on the holders, said shoulders being anchored to the margins of the openings. The aforementioned holders have any suitable or desired color filters 23 and lenses 24 mounted therein and removably held in place by retaining rings 25—26.

Guide rods 27, preferably rectangular in cross section, are extended longitudinally through the four described compartments of the housing, one through each compartment and adjacent the inner corner thereof as shown, these rods being anchored at their ends in the ends of the housing.

Carriages 28 pierced with squared apertures 29 are by these apertures slidably mounted upon the said guide rods, and control rods 30 are connected at their inner ends to the carriages, the free rear ends thereof being extended slidably out through the rear end of the housing where these ends are joined unitarily to a common operating handle 31. All four carriages may then be simultaneously moved, as a unit, forwardly or backwardly along their respective guide rods.

Figures 4, 5, 6:
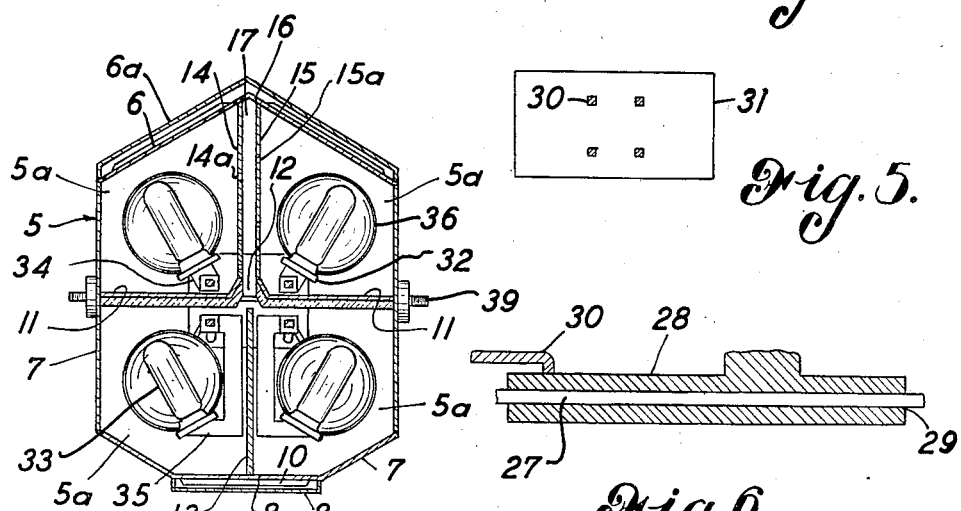
Figure 4 is a transverse sectional view of the projector removed from the supporting stand.
Figure 5 is an inner end view of the focusing handle, the connecting rods being shown in section.
Figure 6 is a sectional view of a portion of the lamp carriage the guide rod being partially shown therein.

Electric lamp sockets 32, having the projection lamps 33 positioned therein, are rigidly mounted on the carriages in an angular position as shown in Figure 4, the upper lamp sockets being mounted upon short upwardly and outwardly extended supporting members 34, while the lower lamp sockets are mounted upon depended outwardly turned U-shaped supporting members 35, the aforementioned supporting members being integrally constructed with the carriages. Spherical reflectors 36 are mounted upon the carriages by means of supporting members 37, welded or otherwise secured thereto, directly behind the lamps so as to concentrate and reflect the light rays upon the lenses in the forward ends of the compartments.

A telescopic supporting stand 38, having the cradle 38a, is provided for supporting the projector, said cradle having the slotted upper ends 38b for the reception of bolts 39, wing nuts 40 being secured upon the bolts for holding the projector in the desired position. A multiple rheostat 41 is mounted upon the supporting stand by means of clamps 42, said rheostat of course being electrically connected with the sockets 32 and having a plurality of control handles or levers 43, the rheostat being designed so as to permit the individual or simultaneous control of the lamps. A pair of service cords 44—45, having the attachment plugs 46—47, are connected to the rheostat for attaching to an electric outlet (not shown) and to a plug 48 upon the projector. Doors 49 are provided upon either side of the housing thereby permitting the operator to examine or adjust the mechanism therein.

In use, the projector, mounted upon the supporting stand by the bolts and nuts 39—40, is focused by moving the handle 31 away from or towards the rear end of the housing, thereby increasing or decreasing the distance between the lenses and lamps, and as the carriages are moved as a unit, all of the light beams are focused simultaneously. The degree of intensity of illumination of the lamps may be varied individually by the use of the rheostat and by the use of suitable color filters as above stated, such as clear, red, yellow and blue. The various colors or shades of colors may be projected by using the light beams in combination.

From the foregoing description it is thought that a clear understanding of this invention will result and although a preferred embodiment has been exemplified, it is understood that minor changes in the construction, combination and arrangement of the various parts may be resorted to as expediency may dictate, not departing however from the spirit of the invention as set forth in the appended claims.

What I claim is:

1. A light projecting machine, comprising an elongated lamp housing partitioned longitudinally both horizontally and vertically to provide four elongated lamp chambers, lenses seated through one end of these four chambers, slide rods extended longitudinally through the four lamp chambers adjacent the inner corners thereof, lamp carriages slidably mounted on the slide rods, control rods passed slidably out through the opposite end of the structure and connected at their inner ends to the said carriages, and electric lamps operatively mounted on the carriages in alignment with the lenses.

2. In a structure as defined in claim 1, the outer ends of the control rods being joined to a common operating handle.

3. In a structure as defined in claim 1, the housing having airways leading out from the several chambers.

HENRY W. LEAVITT.